(12) United States Patent
Bai et al.

(10) Patent No.: US 12,093,747 B2
(45) Date of Patent: Sep. 17, 2024

(54) WORKLOAD ORCHESTRATION IN A MULTI-CLOUD ENVIRONMENT

(71) Applicant: International Business Machines Corporation, Armonk, NY (US)

(72) Inventors: Xu Hui Bai, Beijing (CN); Jian Dong Yin, Beijing (CN); Lan Luo, Beijing (CN); Li Xia, Beijing (CN); Li Long Chen, Beijing (CN); Ann Corrao, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 17/024,846

(22) Filed: Sep. 18, 2020

(65) Prior Publication Data

US 2022/0091903 A1 Mar. 24, 2022

(51) Int. Cl.
| | |
|---|---|
| *G06F 9/50* | (2006.01) |
| *G06F 9/451* | (2018.01) |
| *G06F 9/54* | (2006.01) |
| *G06F 11/30* | (2006.01) |
| *G06F 11/32* | (2006.01) |

(Continued)

(52) U.S. Cl.
CPC .......... *G06F 9/5083* (2013.01); *G06F 9/451* (2018.02); *G06F 9/5072* (2013.01); *G06F 9/542* (2013.01); *G06F 11/3065* (2013.01); *G06F 11/327* (2013.01); *G06Q 20/102* (2013.01); *H04L 9/3239* (2013.01)

(58) Field of Classification Search
None
See application file for complete search history.

(56) References Cited

U.S. PATENT DOCUMENTS

| | | | |
|---|---|---|---|
| 9,432,350 B2 | 8/2016 | Anderson | |
| 10,360,214 B2 | 7/2019 | Gold | |
| 11,063,745 B1* | 7/2021 | Du | H04L 9/0825 |
| 11,157,241 B2* | 10/2021 | Kenkre | H04L 63/08 |
| 2005/0262112 A1* | 11/2005 | Moore | G06Q 10/06 |
| 2017/0279774 A1 | 9/2017 | Booz | |

(Continued)

FOREIGN PATENT DOCUMENTS

CN 108596548 A 9/2018

OTHER PUBLICATIONS

"How to orchestrate and manage workloads in multi-cloud environments", sifytechnologies, printed on Apr. 21, 2020, Copyright © Sify Technologies Limited 2020, 8 pages, <https://www.sifytechnologies.com/blog/orchestrate-and-manage-workloads-in-multi-cloud-environments/>.

(Continued)

*Primary Examiner* — Chat C Do
*Assistant Examiner* — William C Wood
(74) *Attorney, Agent, or Firm* — Joseph P. Curcuru

(57) ABSTRACT

In an approach to improve workload orchestration in a multi-cloud environment, embodiments orchestrate and manage a workload in a decentralized multi-cloud environment using one or more smart contracts. Additionally, embodiments measure, by a competency measurement component, competency of cloud services based on one or more predefined cloud benchmarks, a consensus network, and the one or more smart contracts, and generate an orchestration plan that is a best fit for the workload. Furthermore, embodiments validate and update, by the consensus network and the one or more smart contracts, the generated orchestration plan, and executing the generated orchestration plan.

20 Claims, 7 Drawing Sheets

(51) Int. Cl.
    *G06Q 20/10* (2012.01)
    *H04L 9/32* (2006.01)

(56) References Cited

U.S. PATENT DOCUMENTS

| | | | |
|---|---|---|---|
| 2019/0036778 A1 | 1/2019 | Bathen | |
| 2019/0377660 A1* | 12/2019 | Huang | G06F 11/3409 |
| 2021/0194890 A1* | 6/2021 | Mohalik | H04L 67/10 |
| 2021/0327007 A1* | 10/2021 | Han | H04L 9/50 |
| 2021/0373984 A1* | 12/2021 | Lu | G06F 16/955 |
| 2021/0374675 A1* | 12/2021 | George | G06F 11/30 |

OTHER PUBLICATIONS

Disclosed Anonymously, "Method and System for Providing an Efficient Service Integration and Management Using a Blockchain", An IP.com Prior Art Database Technical Disclosure, IP.com No. IPCOM000255998D, IP.com Electronic Publication Date: Oct. 29, 2018, 6 pages.

Disclosed Anonymously, "Method for Cloud and Cloud-Service Selection", An IP.com Prior Art Database Technical Disclosure, IP.com No. IPCOM000206909D, IP.com Electronic Publication Date: May 13, 2011, 8 pages.

Kobielus, James, "Managing the multicloud will require lots of AI—but people too", SiliconANGLE, May 31, 2019, 8 pages, <https://siliconangle.com/2019/05/31/managing-multicloud-will-require-lots-ai-people/>.

Mell et al., "The NIST Definition of Cloud Computing", NIST, National Institute of Standards and Technology, Special Publication 800-145, Sep. 2011, 7 pages.

Mrvosevic, Mattia, "Blockchain Based Decentralised Cloud Computing", Overview and Use Cases, Eterna Capital, Feb. 21, 2019, 18 pages.

* cited by examiner

WORKLOAD ORCHESTRATION IN A MULTI-CLOUD ENVIRONMENT

BACKGROUND OF THE INVENTION

The present invention relates generally to the field of multi-cloud environments, and more particularly to workload orchestration in multi-cloud environments.

Multi-cloud is the use of multiple cloud computing and storage services in a single heterogeneous architecture. A multi-cloud environment is an environment where an enterprise uses more than one cloud platform, wherein each cloud platform delivers a specific application or service. With a typical multi-cloud architecture utilizing two or more public clouds as well as multiple private clouds, a multi-cloud environment aims to eliminate the reliance on any single cloud provider. It differs from hybrid cloud in that it refers to multiple cloud services rather than multiple deployment modes (public, private, legacy). Also, in a multi-cloud environment, synchronization between different vendors is not essential to complete a computation process, unlike parallel computing or distributed computing environments. For example, an enterprise may concurrently use separate cloud providers for infrastructure, platform, and software services, or use multiple infrastructure or platform providers. In the latter case, an enterprise may use different infrastructure providers for different workloads, deploy a single workload load balanced across multiple providers (active-active), or deploy a single workload on one provider, with a backup workload on another provider (active-passive).

SUMMARY

Embodiments of the present invention disclose a method, a computer program product, and a system for workload orchestration in a multi-cloud environment, the method comprising: orchestrating and managing a workload in a decentralized multi-cloud environment using one or more smart contracts; measuring, by a competency measurement component, competency of cloud services based on one or more predefined cloud benchmarks, a consensus network, and the one or more smart contracts; generating an orchestration plan that is a best fit for the workload; validating and updating, by the consensus network and the one or more smart contracts, the generated orchestration plan; and executing the generated orchestration plan.

DETAILED DESCRIPTION

Figure 1:
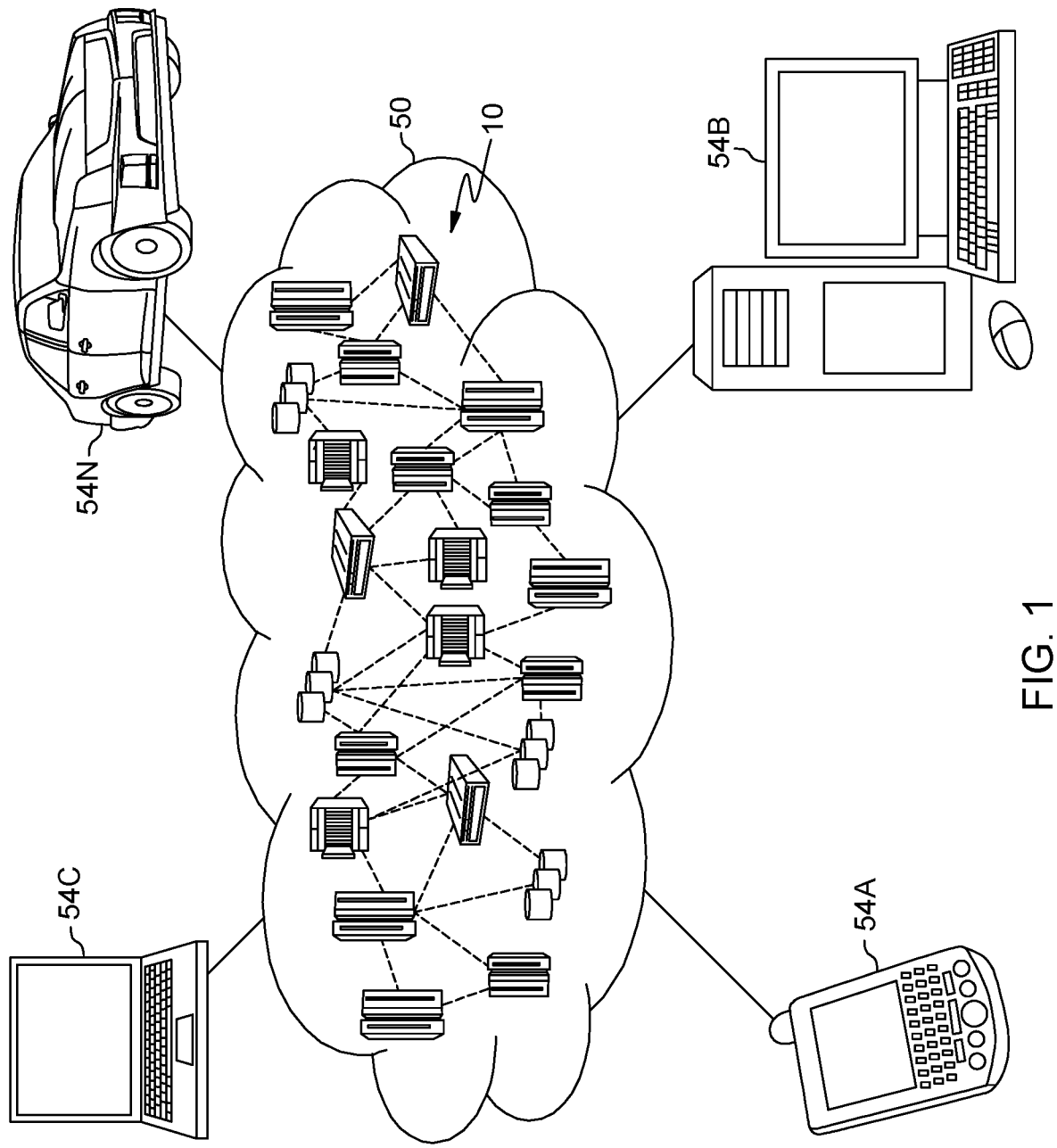
FIG. 1 depicts a cloud computing environment according to an embodiment of the present invention.

Currently, customers (i.e., users) adopt a multi-cloud strategy to escape vendor lock-in. Multi-cloud environments enable users to experience greater availability, agility and efficiency; however, current multi-cloud approaches have the following drawbacks: (i) when moving to multi-cloud, users are confused by marketing noises generated by opinionated statements from various vendors; (ii) users may purchase solutions from centralized multi-cloud providers, but there is no trust, transparency and traceability in a centralized multi-cloud environment; (iii) cloud providers offer specialized cloud services for various technologies, such as artificial intelligence (AI), machine learning (ML), and internet of things (IOT) and that it is difficult for users to identify advantages around these cloud providers and their offerings; and (iv) there is no finality to measure the competency of each cloud service.

In addition to the particular problems stated above, embodiments of the present invention recognize that current multi-cloud orchestration providers claim to take advantage of the unique benefits offered by public, private and hybrid cloud services. Furthermore, embodiments of the present invention recognize that there are no provenances (i.e., attributes) detailing that the proposed orchestration plans executed by the multi-cloud orchestration providers is the best fit for each workload based on competency of each cloud service. The best fit for a workload is an orchestration plan that meets a predetermined amount of requirements for a workload. For example, requirements of workload could be: datacenter location is Paris France; request latency greater than 10 milliseconds (ms); and security: GDPR. In this example, the best fit is the orchestration that meets all the workload requirements. Embodiments of the present invention recognize that when using a multi-cloud environment, additional contracts with additional cloud providers will be added to the blockchain. Embodiments of the present invention recognize that higher cost are associated with centralized multi-cloud providers, and that there is no decentralized platform for users to sign a contract directly with cloud providers.

For example, given a web application project, a customer (i.e., a user) defines the requirements of the backend for frontend, and the backend and database. The requirements include, but are not limited to, security standard (e.g., Center For Internet Security (CIS) 2.0), General Data Protection Regulation (GDPR) compliance, Health Insurance Portability and Accountability Act (HIPPA) compliance, uptime, costs, data policies (e.g., data location), reliability & performance (e.g., transaction per second (TPS) and autoscaling), and cloud resources (e.g., central processing unit (CPU), memory (MEM), disk, and network bandwidth). Embodiments of the present invention recognize that these requirements are measured for competency within the cloud services. Competencies of cloud services (e.g., security, compliance, and/or any other cloud service competencies known in the art) from each cloud provider is evaluated by one or more predefined benchmarks, endorsed by one or more main public cloud providers, validated by a consensus network, and stored in a ledger.

Embodiments of the present invention improve the current art by generating an orchestration plan using one or more smart contracts based on the competencies of one or more cloud services. An orchestration plan defines which cloud services should be used to meet user's requirement. An orchestration plan is generated for each user's workload and validated by a consensus network, so the cloud services defined in the orchestration plan are the best-fit for a user's workload, improving the current art. An orchestration plan can be transformed to an orchestration template, and executed on various orchestration systems (e.g., a container-orchestration system).

Embodiments of the present invention addresses the drawbacks and specific problems stated above by measuring the competency of each cloud service based on predefined cloud benchmarks. Embodiments of the present invention improve the art of multi-cloud by enabling the validation of both competency and orchestration for the cloud providers using a consensus network. For example, worker nodes in a blockchain network will execute the generated orchestration plan and deploy the workload in a decentralized multi-cloud environment.

More specifically, embodiments of the present invention improve the art by enabling a decentralized multi-cloud provider environment to orchestrate the workload in a multi-cloud environment. Embodiments of the present invention solve the problems stated above by orchestrating and managing workloads in a decentralized multi-cloud environment using blockchain and smart contracts. Additionally, embodiments of the present invention solve the problems stated above and improve the art of multi-cloud by (i) measuring the competency of cloud services based on a plurality of predefined cloud benchmarks using a consensus network and smart contracts; (ii) generating one or more orchestration plans that are tailored to a user's specification and/or the best fit for each workload using the consensus network and the smart contracts; and/or (iii) enabling users to automatically sign and manage blockchain contracts (i.e., contracts) with one or more cloud providers. It should be noted that in blockchain, contracts are implemented through digital signature, which is related to private key, public key and digital certificate.

Implementation of embodiments of the invention may take a variety of forms, and exemplary implementation details are discussed subsequently with reference to the Figures (i.e., FIG. 1-FIG. 7).

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to Figure (FIG.) 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
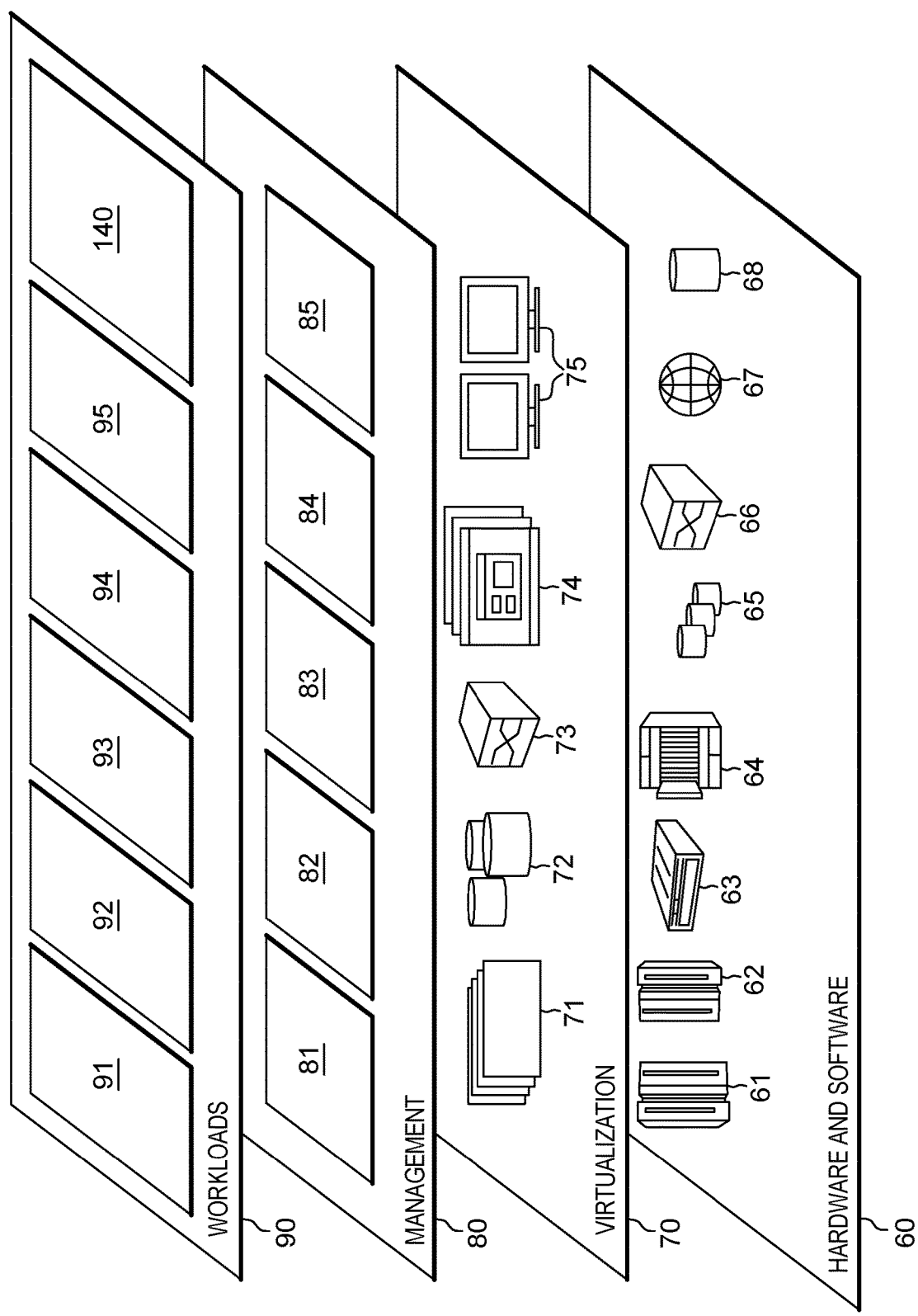
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68".

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and workload orchestration (orchestration) component 140.

Figure 3:
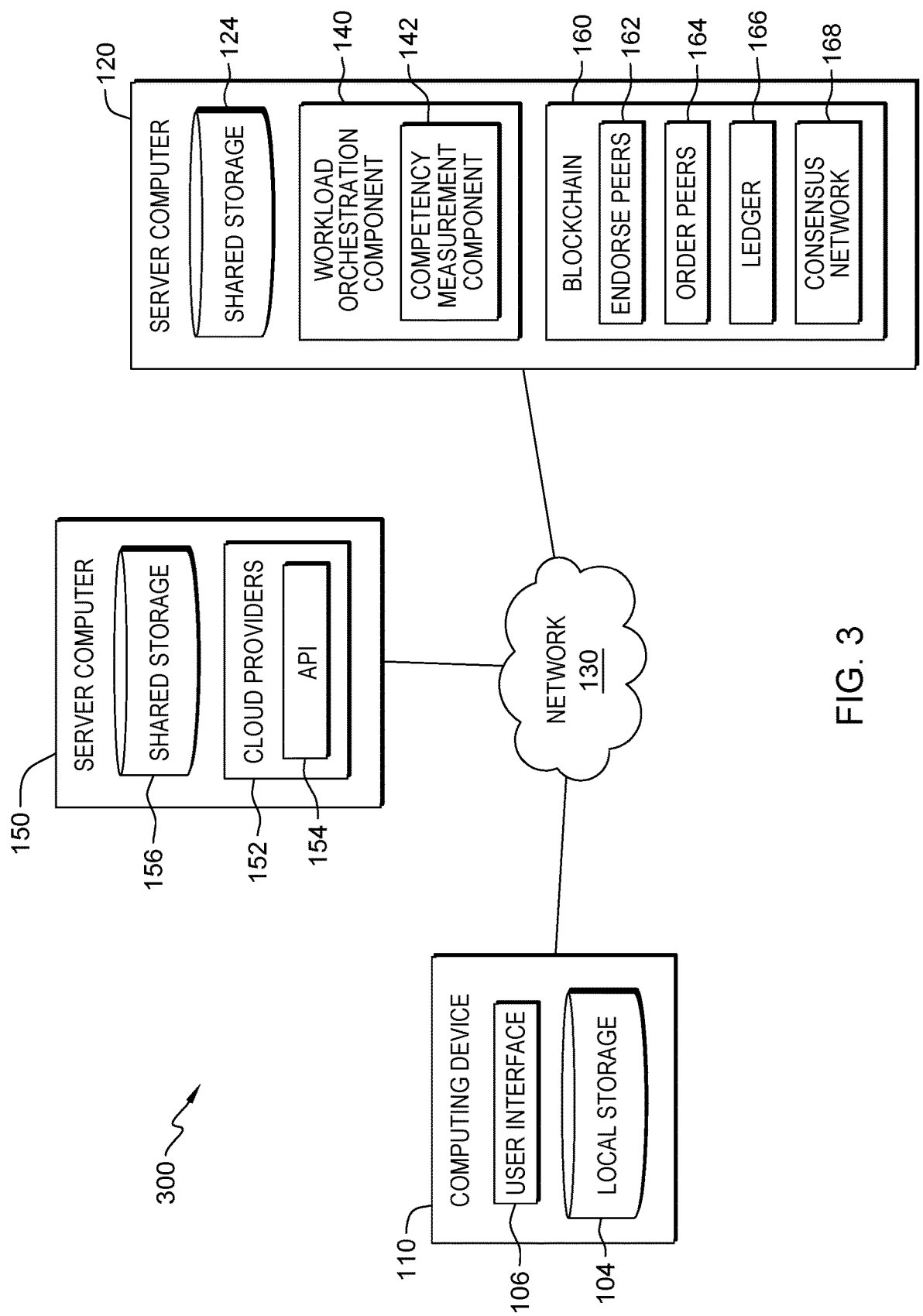
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 300 includes computing device 110, server computer 120, and server computer 150 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110, server computer 120, and server computer 150, and any other computing devices, server computers, and/or storage devices (not shown in FIG. 3) within distributed data processing environment 300.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 300, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120 and/or server computer 150. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120, server computer 150 and other computing devices (not shown) within distributed data processing environment 300 via a network, such as network 130. Computing device 110 may include an instance of user interface (interface) 106, and local storage 104. In various embodiments, not depicted in FIG. 3, computing device 110 may have a plurality of user interfaces. In other embodiments, not depicted in FIG. 3, distributed data processing environment 300 may comprise a plurality of computing devices, plurality of server computers, and/or one a plurality of networks. Computing device 110 may include internal and external hardware components, as depicted, and described in further detail with respect to FIG. 7.

User interface (interface) 106 provides an interface to computing device 110, server computer 120, server computer 150, orchestration component 140, cloud providers 152, blockchain 160, and/or any other user accessible component (e.g., software, webservice, and/or hardware) executing within distributed data processing environment 300. Computing device 110, via user interface 106, may enable a user and/or a client to interact with orchestration component 140, competency measurement component 142, server computer 150, and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110, server computer 120, and/or server computer 150. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Cloud providers 152 may be, for example, one or more suppliers or providers of cloud services that offers a cloud-based service such as platform (PaaS), infrastructure (IaaS), SaaS, application, and/or storage services. Additionally, cloud providers 152 provide cloud services which are used to deploy user's workload. A user defines one or more workload templates and can manage the workload in an orchestration system (i.e., orchestration component 140).

Application programing interface (API) 154 is a computing interface which defines interactions between multiple software intermediaries. API 154 defines the kinds of calls or requests that can be made, such as, but not limited to, how to make them, the data formats that should be used, and the conventions to follow. API 154 can also provide extension mechanisms so that users can extend existing functionality in various ways and to varying degrees. API 154 can be entirely custom, specific to a component, or it can be designed based on an industry standard to ensure interoperability. Through information hiding, API 154 enables modular programming, which allows users to use the interface independently of the implementation. API 154 can be one or more API's as they are understood in the art. In the depicted embodiment API 154 is executed on clout providers 152 however, in other embodiments not depicted in FIG. 3, API 154 may be executed anywhere within distributed data processing environment 300 as long as API 154 is in communication with cloud providers 152, server computer 120, server computer 150, orchestration component 140, computing device 110, and/or blockchain 160 over network 130.

Server computer 120 and server computer 150 may each be a standalone computing device, a management server, a web server, a mobile computing device, one or more client servers, or any other electronic device or computing system capable of receiving, sending, and processing data. In other embodiments, server computer 120 and server computer 150 may each represent a server computing system utilizing multiple computers such as, but not limited to, a server system, such as in a cloud computing environment. In another embodiment, server computer 120 and server computer 150 may each represent a computing system utilizing clustered computers and components (e.g., database server computers, application server computers, etc.) that act as a single pool of seamless resources when accessed within distributed data processing environment 300. Server computer 120 and server computer 150 may each include internal and external hardware components, as depicted, and described in further detail with respect to FIG. 7. In some embodiments of the present invention, server computer 120 and server computer 150 may each represent a plurality of server computers.

Each of shared storage 124, shared storage 156, and local storage 104 may be a data/knowledge repository and/or a database that may be written and/or read by one or a combination of component 112, server computer 120, server computer 150, and computing device 110. In the depicted embodiment, shared storage 124 resides on server computer 120, shared storage 156 resides on server computer 150, and local storage 104 resides on computing device 110. In another embodiment, shared storage 124, shared storage 156, and/or local storage 104 may reside elsewhere within distributed data processing environment 300, provided that each may access and is accessible by computing device 110, server computer 120, and server computer 150. Shared storage 124, shared storage 156, and/or local storage 104 may each be implemented with any type of storage device capable of storing data and configuration files that may be accessed and utilized by server computer 120 and/or server computer 150, such as, but not limited to, a database server, a hard disk drive, or a flash memory.

In some embodiments of the present invention, shared storage 124, shared storage 156, and/or local storage 104 may each be a hard drive, a memory card, a computer output to laser disc (cold storage), and/or any form of data storage known in the art. In some embodiments, shared storage 124, shared storage 156, and/or local storage 104 may each be one or more cloud storage systems and/or databases linked to a cloud network. In various embodiments, shared storage 124, shared storage 156, and/or local storage 104 may access, store, and/or house user data, physical room data, and meeting data, and/or data shared throughout distributed data processing environment 300.

Blockchain 160 is a blockchain network as it is known in the art. In the depicted embodiment, blockchain 160 comprises a set of peer nodes (e.g., endorse peers 162 and order peers 164). Peer nodes may host ledgers (e.g., ledger 166) and smart contracts as they are known and understood in the art. In various embodiments of the present invention, ledger 166 is a database that is consensually shared and synchronized across multiple sites, institutions, or geographies, accessible by multiple people. A ledger (e.g., ledger 166) records the transactions generated by smart contracts. The one or more smart contracts used by orchestration component 140 may define the logic that is used to generate a workload orchestration plan based on cloud resources competency (e.g., competency measurements). The one or more smart contracts used by competency measurement component 142 may define the logic that details how to measure competency of cloud services (i.e., competency measurements) using cloud service API (i.e., API 154).

In the depicted embodiment, blockchain 160 is executed on server computer 120; however, in other embodiments, not depicted in FIG. 3, blockchain 160 may be executed on one or more server computers 120, computing device 110, cloud providers 152, and/or anywhere within distributed data processing environment 300 as long as blockchain 160 is in communication with server computer 120, server computer 150 computing device 110, and/or orchestration component 140. Within blockchain 160, smart contracts and ledgers 166 are used to encapsulate the shared processes and shared information in a network, respectively.

In the depicted embodiment, blockchain 160 comprises endorse peers 162 and order peers 164. In other embodiments, not depicted in FIG. 3, blockchain 160 may comprises any type of peer node known in the art. A peer node may be created, started, stopped, reconfigured, and even deleted. Peer nodes expose a set of APIs (e.g., API 154) that enable administrators and applications to interact with the services that the APIs provide. Endorse peers 162 and order peers 164 can each be one or more peer nodes in a blockchain (i.e., blockchain 160). Endorse peers 162 provide an endorsement of the proposed ledger update to the application. Endorsing peers 162 may execute a chain-code using a transaction proposal to generate a transaction proposal response, and may sign and return the transaction proposal to an application. Endorsing peers 162 may assist in enabling the scalability and confidentiality in blockchain 160.

Ordering/orderer nodes (i.e., order peers 164) performs transaction ordering, which along with other orderer nodes form an ordering service. Order peers 164 may maintain the list of organizations that enable the creation of channels. This list of organizations is known as the "consortium," and the list itself is kept in the configuration of the ordering system channel. Order peers 164 may also enforce basic access control for channels, restricting who or what has access to read and write data to the channels, and who or what can configure the channels.

In various embodiments of the present invention, configuration transactions are processed by order peers 164, wherein order peers 164 contain and enforce the current set of policies to execute the basic form of access control. For example, order peers 164 processes the configuration update to determine that the requestor has the proper administrative rights. If the requestor has the proper administrative rights, order peers 164 validates the update request against the existing configuration, generates a new configuration transaction, and packages it into a block that is relayed to the peers on the channel. Endorse peers 162 then process the configuration transactions in order to verify that the modifications approved by order peers 164 do indeed satisfy the policies defined in the channel. Blockchain 160 verifies transactions (e.g., orders, services, etc.) using a consensus mechanism (i.e., consensus network 168). Consensus network 168 is a fault-tolerant mechanism that is used in computer and blockchain systems to achieve the necessary agreement on a single data value or a single state of the network among distributed processes or multi-agent systems.

In the depicted embodiment, orchestration component 140 executes on server computer 120. In other embodiments, orchestration component 140 may be executed on computing device 110. In various embodiments of the present invention, not depicted in FIG. 3, orchestration component 140 may execute on a plurality of server computers 120, a plurality of server computers 150, and/or on a plurality of computing devices 110. In some embodiments, orchestration component 140 may be located and/or executed anywhere within distributed data processing environment 300 as long as orchestration component 140 is connected to and/or communicates with competency measurement component 142, computing device 110, server computer 150, and/or server computer 120, via network 130. In various embodiments of the present invention, orchestration component 140 is an orchestration system that invokes one or more smart contracts to generate one or more orchestration plans, wherein the orchestration plans are validated by consensus network 168 and the final orchestration plan (i.e., the validated orchestration plans) is stored in ledger 166. In various embodiments of the present invention, orchestration component 140 reads the one or more orchestration plans from ledger 166 and executes the read one or more orchestration plans by calling cloud service API (i.e., API 154). In various embodiments of the present invention, orchestration component 140 provides workload lifecycle management.

In the depicted embodiment, competency measurement component 142 is executed on orchestration component 140 on server computer 120. In other embodiments, competency measurement component 142 may be executed on computing device 110. In various embodiments of the present invention, not depicted in FIG. 3, competency measurement component 142 may execute on a plurality of server computers 120, a plurality of server computers 150, and/or on a plurality of computing devices 110. In some embodiments, competency measurement component 142 may be located and/or executed anywhere within distributed data processing environment 300 as long as competency measurement component 142 is connected to and/or communicates with orchestration component 140, computing device 110, server computer 150, and/or server computer 120, via network 130.

In various embodiments of the present invention, competency measurement component 142 periodically invokes one or more smart contracts to measure competency of one or more cloud services provided by cloud providers 152. The measurement results generated by competency measurement component 142 may be validated by consensus network 168 and the final results are stored in ledger 166. In various embodiments of the present invention, orchestration component 140 improves the art of multi-cloud environments by (i) orchestrating and managing workloads in decentralized multi-cloud environment using blockchain and smart contracts; (ii) measuring the competency of cloud services, via competency measurement component 142, based on one or more predefined cloud benchmarks with one or more consensus networks 168 and one or more smart contracts; (iii) generating an orchestration plan that is tailored and/or the best fit for a validated workload, wherein the best fit orchestration plan is updated by consensus network 168 and one or more smart contracts; and (iv) enabling users (i.e., users) to automatically sign and manage contracts with cloud providers.

Figure 4:
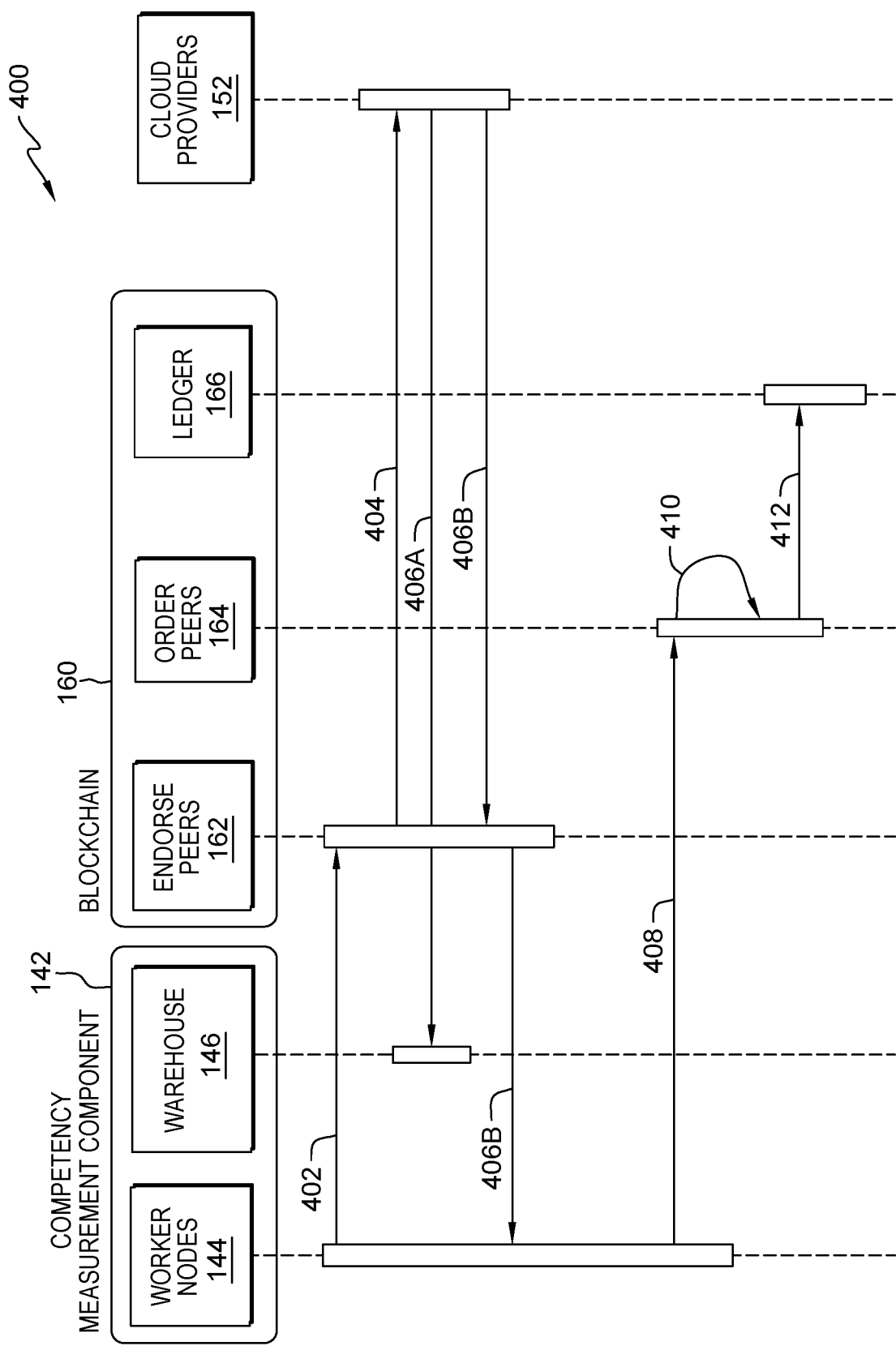
FIG. 4 illustrates operational steps of a competency measurement component, on a server computer within the distributed data processing environment of FIG. 3, for competency measurement of cloud services for workload orchestration in a multi-cloud environment, in accordance with an embodiment of the present invention.

FIG. 4 illustrates operational steps depicting competency measurement component 142, generally designated 400, in communication with computing device 110 and/or server computer 120, within distributed data processing environment 300 of FIG. 3, for competency measurement of cloud services for workload orchestration in a multi-cloud environment, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, FIG. 4 depicts one example the competency measurement component 142 workflow. In the depicted embodiment, for each type of cloud service, competency measurement component 142 defines or predefines one or more cloud benchmark JavaScript Object Notion (JSON) templates, which includes one or more cloud service descriptions, inputs that may be used by competency measurement component 142, and a list of cloud providers 152 that support the one or more cloud services described in the one or more cloud benchmark JSON templates.

In step 402 competency measurement component 142, via worker nodes 144, receives instructions to invoke a measurement request and submits a measurement request to blockchain 160, via endorse peers 162. Worker nodes 144 are a computing system that runs competency measurements related to services. Worker nodes 144 are connected to each other and are consistently exchanging the latest blockchain data with each other so the nodes in the blockchain stay up to date. Worker nodes 144 periodically read and submit benchmark templates to blockchain 160 and/or any other components of blockchain 160. In the depicted embodiment, endorse peers 162 receive the measurement request from worker nodes 144 and execute a smart contract. The smart contract analyzes the benchmark template and measures cloud service competency by cloud provisioner. In various embodiments of the present invention, endorse peers 162 retrieves a predetermined smart contract from blockchain 160 that is associated with a particular workload and/or user.

In step 404, endorse peers 162 executes an API call, via API 154. In the depicted embodiment, endorse peers 162 executes one or more API calls, via API 154, to cloud providers 152. In various embodiments of the present invention, a cloud provisioner is implemented based on the call to API 154 and/or the software development kit (SDK) from cloud providers 152.

In step 406A, cloud providers 152 retrieves the read inputs and sends the read inputs to warehouse 146. In the depicted embodiment, cloud providers 152 sends the received and/or retrieved read inputs to endorse peers 162, wherein endorse peers sends the retrieved read inputs to competency measurement component 142, via warehouse 146. In various embodiments of the present invention, competency measurement component 142 via warehouse 146, retrieves the read inputs from cloud providers 152 and endorse peers 162.

In step 406B, endorse peers 162 receive measurement results from cloud providers 152 and sends the measurement results to worker nodes 144. In various embodiments of the present invention, competency measurement component 142 retrieves measurement results from cloud providers 152 by requesting the measurement results from cloud providers 152. In the depicted embodiment, cloud providers 152 sends the measurement results to endorse peers 162, wherein endorse peers 162 send the measurement results to worker nodes 144.

In step 408, worker nodes 144 initiates and executes a validation request. In the various embodiments of the present invention, worker nodes 144 sends a validation request to order peers 164 and/or consensus network 168 to validate the orchestration plan. In various embodiments of the present invention, worker nodes 144 receives measurement results from endorse peers 162 and sends the measurement results to consensus network 168 for validation. In the depicted embodiment, competency measurement component 142, via worker nodes 144, instruct order peers 164 to validate. In various embodiments of the present invention, order peers 164, in communication with consensus network 168, not depicted in FIG. 4, validates the measurement results based on the practical byzantine fault tolerance (PBFT) algorithm.

In step 410, order peers 164 generates final measurement results based on the output of the validation request in step 408. In various embodiments of the present invention, order peers 164 outputs and displays the final measurement results to a customer (i.e., user), via UI 106 on computing device 110.

In step 412, order peers 164 stores the generated final measurement results to ledger 166. In various embodiments of the present invention, order peers can store the generated final measurement results on shared storage 124 and/or local storage 104. In various embodiments of the present invention, orchestration component 140 can issue an alert notification to one or more users, via computing device 110, when order peers 164 stores the final measurement results to ledger 166, shared storage 124 and/or local storage 104.

Figure 5:
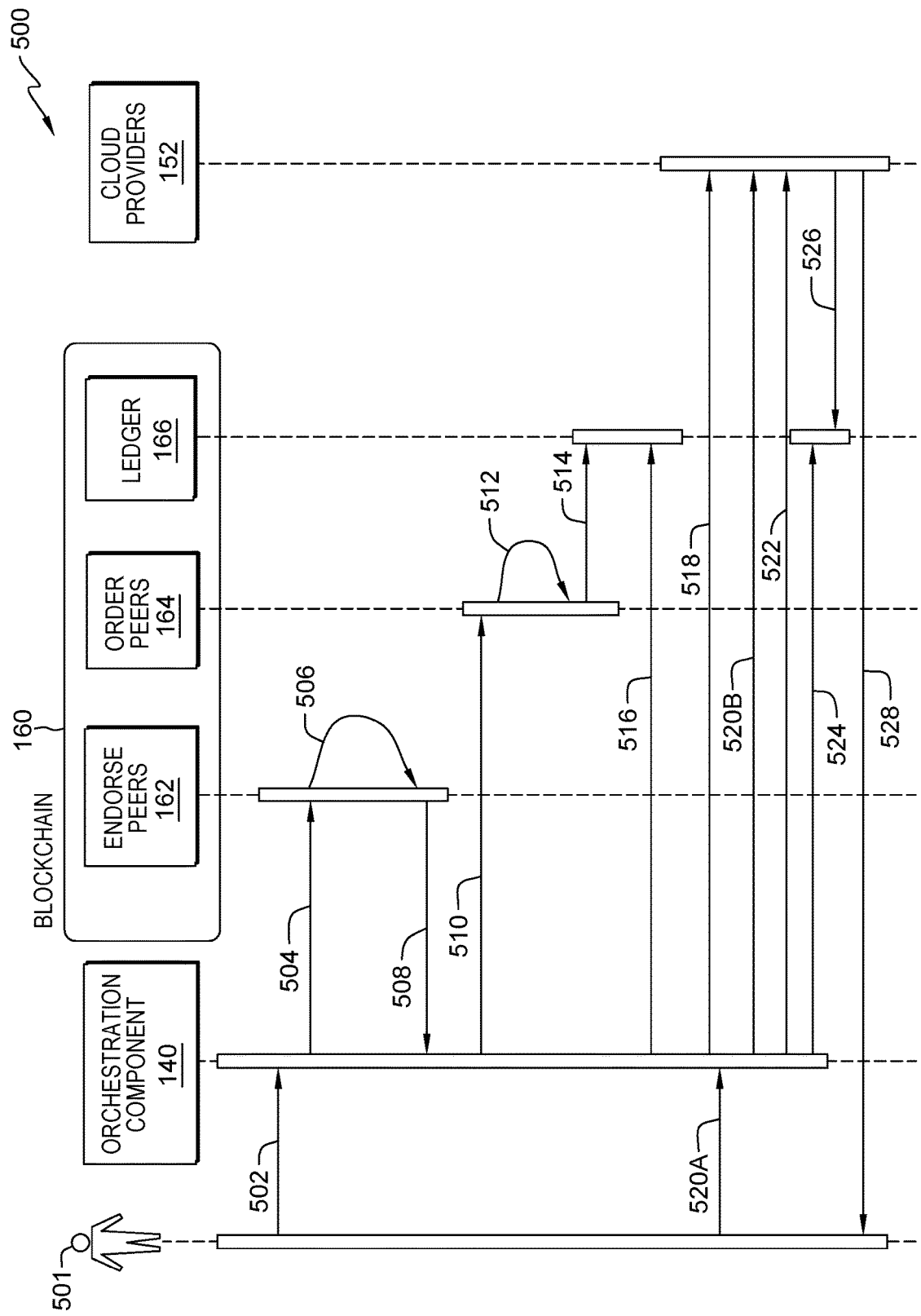
FIG. 5 illustrates operational steps of an orchestrating component, on the server computer within the distributed data processing environment of FIG. 3, for workload orchestration in a multi-cloud environment, in accordance with an embodiment of the present invention.

FIG. 5 illustrates operational steps of orchestration component 140, generally designated 500, in communication with server computer 120, within distributed data processing environment 300 of FIG. 3, for workload orchestration in a multi-cloud environment, in accordance with an embodiment of the present invention. FIG. 5 provides an illustration of one implementation and does not imply any limitations with regard to the environments in which different embodiments may be implemented. Many modifications to the depicted environment may be made by those skilled in the art without departing from the scope of the invention as recited by the claims.

In step 502, a customer (i.e., user 501) manages one or more workload templates. In various embodiments of the present invention, user 501 defines one or more workload templates with functional requirements and non-functional requirements, such as virtual machine settings, network bandwidth, storage size, location, performance and security. In the depicted embodiment, workload templates are stored on orchestration component 140, wherein user 501 submits a workload orchestration request to orchestration component 140. In various embodiments of the present invention, the workload templates are predetermined.

In step 504, orchestration component 140 executes and submits an orchestration request to endorse peers 162. Endorse peers 162, in blockchain 160, may receive workload request and run smart contracts. A smart contract reads workload templates, analyzes what kinds of cloud services should be used, reads cloud service competency from blockchain ledger, and generates an orchestration plan that is tailored and/or the best fit for the current workload.

In step 506, endorse peers 162 generates an orchestration plan based on the orchestration request. An orchestration plan has key-value attributes including, but not limited to, cloud service usage data, orchestration plan name, metadata, labels, and cloud provider name. In various embodiments of the present invention, an orchestration plan is executed on orchestration component 140, wherein the orchestration plan is in JSON format, and contains a list of key-value attributes. The key-value attributes may be used by orchestration system to provision workload. In some embodiments, the key-value attributes are predetermined. Endorse peers 162, via one or more smart contracts associated with a workload, generates an orchestration plan that is the best fit for a particular workload, wherein an orchestration plan that is the best fit for a particular workload is an orchestration plan that meets a predetermined amount of requirements for a workload.

In step 508, endorse peers 162 returns the generated orchestration plan to orchestration component 140. In the depicted embodiment, endorse peers 162 sends the generated orchestration plans to orchestration component 140. In various embodiments of the present invention, orchestration component 140 retrieves one or more generated orchestration plans from endorse peers 162.

In step 510, orchestration component 140 initiates and executes an orchestration validation request. In the depicted embodiment, orchestration component 140 receives orchestration plans and submits the orchestration plans to consensus network 168 for validation. In the depicted embodiment, order peers 164 in communication with consensus network 168 validates the orchestration plans based on the PBFT algorithm.

In step 512 order peers 164 generates a validated orchestration plan. In the depicted embodiment, order peers 164 generates a validated orchestration plan based on the PBFT consensus. In various embodiments of the present invention, order peers 164 outputs and displays the final measurement results to the customer (i.e., user), via UI 106 on computing device 110.

In step 514, order peers 164 stores the validated orchestration plan on ledger 166. In various embodiments of the present invention, order peers 164 can store the generated validated orchestration plan on shared storage 124 and/or local storage 104. In various embodiments of the present invention, orchestration component 140 can issue an alert notification to one or more users, via computing device 110, when order peers 164 stores the validated orchestration plan to ledger 166, shared storage 124 and/or local storage 104.

In step 516, orchestration component 140 reads the validated orchestration plan from ledger 166. In various embodiments of the present invention, orchestration component 140 reads the stored validated orchestration plan from ledger 166. Orchestration component 140 may identify and store the relationship between the validated orchestration plan and the current workload to ledger 166, shared storage 124 and/or local storage 104.

In step 518, orchestration component 140 executes the validated orchestration plan using cloud providers 152. In various embodiments of the present invention, orchestration component 140 executes and deploys the workload in a multi-cloud environment, via cloud providers 152, based on the validated orchestration plan.

In step 520A, orchestration component 140 manages the workload. In the depicted embodiments, orchestration component 140 receives a request to manage a workload (e.g., current workload) from user 501, via UI 106. In step 520B, orchestration component 140 updates and submits the workload templates to cloud providers 152, wherein the validated orchestration plan will be updated based on the updated workload templates and validated by consensus network 168 for a second time. In the depicted embodiment, orchestration component 140 receives updated workload templates from a user and submits the updated workload templates cloud providers 152. In various embodiments of the present invention, orchestration component 140 uses the validated orchestration plan to update workload.

In step 522, orchestration component 140 collects cloud service usage data used by the workload. In various embodiment of the present invention, orchestration component 140 collects cloud usage data generated by each workload from cloud providers 152. In various embodiments of the present invention, orchestration component 140 retrieves the cloud service usage data of a workload from cloud providers 152 and generates a report, based on the retrieved cloud service usage data, and displays the report to user 501, via UI 106.

In step 524, orchestration component 140 updates the validated orchestration plan attributes based on a smart contract. In various embodiments of the present invention, orchestration component 140 updates one or more validated orchestration plan attributes using on one or more smart contracts associated with the workload and/or validated orchestration plan. In various embodiments of the present invention, orchestration component 140 retrieves and/or accesses one or more smart contracts associated with the workload and/or validated orchestration plan and identifies workload and/or validated orchestration plan attributes in the one or more smart contracts. Orchestration component 140 may update the validated orchestration plan attributes based on the identified workload and/or validated orchestration plan attributes in the one or more smart contracts and store the updated plan on ledger 166. In some embodiments, orchestration component 140 may update ledger 166 with the usage attributes of the validated orchestration plan.

In step 526, ledger 166 reads the cloud service usage data. In the depicted embodiment, ledger 166 retrieves and reads the cloud service usage data from cloud providers 152. In various embodiments of the present invention, orchestration component 140 can instruct ledger 166 and/or one or more smart contracts to request, retrieve, and/or read the cloud service usage data for one or more workloads.

In step 528, cloud providers 152 charges user 501. In various embodiments of the present invention, orchestration component 140 charges one or more user base on the validated orchestration plan stored in ledger 166. In the depicted embodiment, cloud providers 152 issues and executes a charge notification to users based on the validated orchestration plan stored in ledger 166. In various embodiments of the present invention, orchestration component 140 retrieves a charge notification from cloud providers 152 based on the validated orchestration plan stored in ledger 166 and issues a notification, via UI 106, to user 501 alerting user 501 of the charge, wherein the notification comprises cloud service usage data and access to the validated orchestration plan, workload, validated orchestration plan, and validated orchestration plan attributes.

Figure 6:
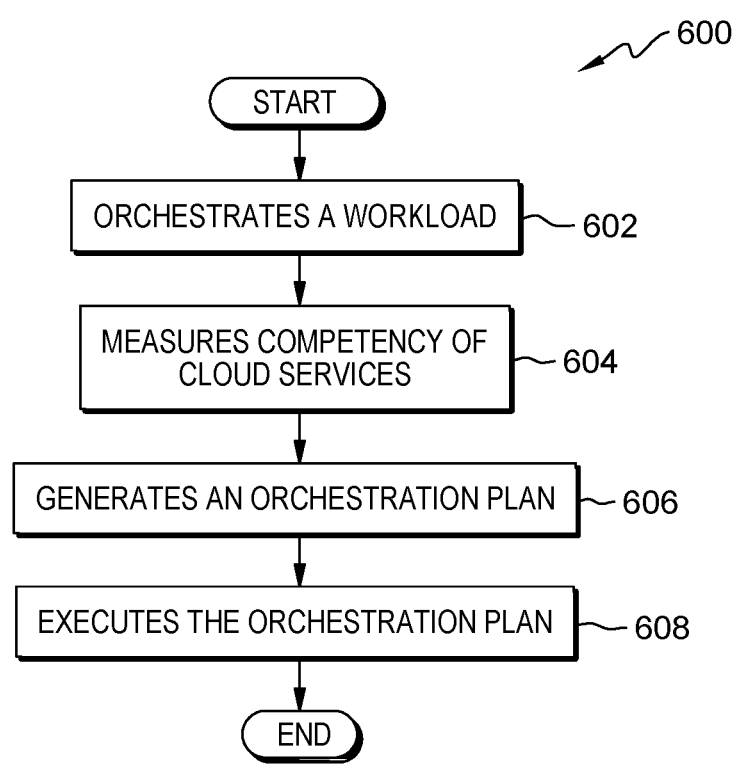
FIG. 6 illustrates operational steps of the orchestrating component, on the server computer within the distributed data processing environment of FIG. 3, for workload orchestration in a multi-cloud environment, in accordance with an embodiment of the present invention.

FIG. 6 illustrates operational steps of orchestration component 140, generally designated 600, in communication with server computer 120, within distributed data processing environment 300 of FIG. 3, for workload orchestration in a multi-cloud environment, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In step 602, orchestration component 140 orchestrates a workload in a decentralized multi-cloud environment. In various embodiments of the present invention, orchestration component 140 orchestrates and manages one or more workloads in a decentralized multi-cloud environment comprising blockchain 160 and smart contracts.

In step 604, orchestration component 140 measures competency of cloud services. In various embodiments of the present invention, orchestration component 140 measures the competency of cloud services by retrieving and reading cloud service measurement results, similar to embodiments described in FIG. 4, from cloud providers 152.

In step 606, orchestration component 140 generates an orchestration plan for a workload. In various embodiments of the present invention, orchestration component 140 generates one or more orchestration plans for one or more workloads that are tailored to each specific workload or identified as the best fit for each workload using consensus network 168 and one or more smart contracts, similar to embodiments described in FIG. 5.

In step 608, orchestration component 140 executes the generated orchestration plan. In various embodiments of the present invention, orchestration component 140 executes one or more orchestration plans. In various embodiments of the present invention, orchestration component 140 enables users to automatically sign and manage contracts with cloud providers 152. A user can instruct orchestration component 140 to automatically sign and mange smart contracts based on predetermined user settings.

Figure 7:
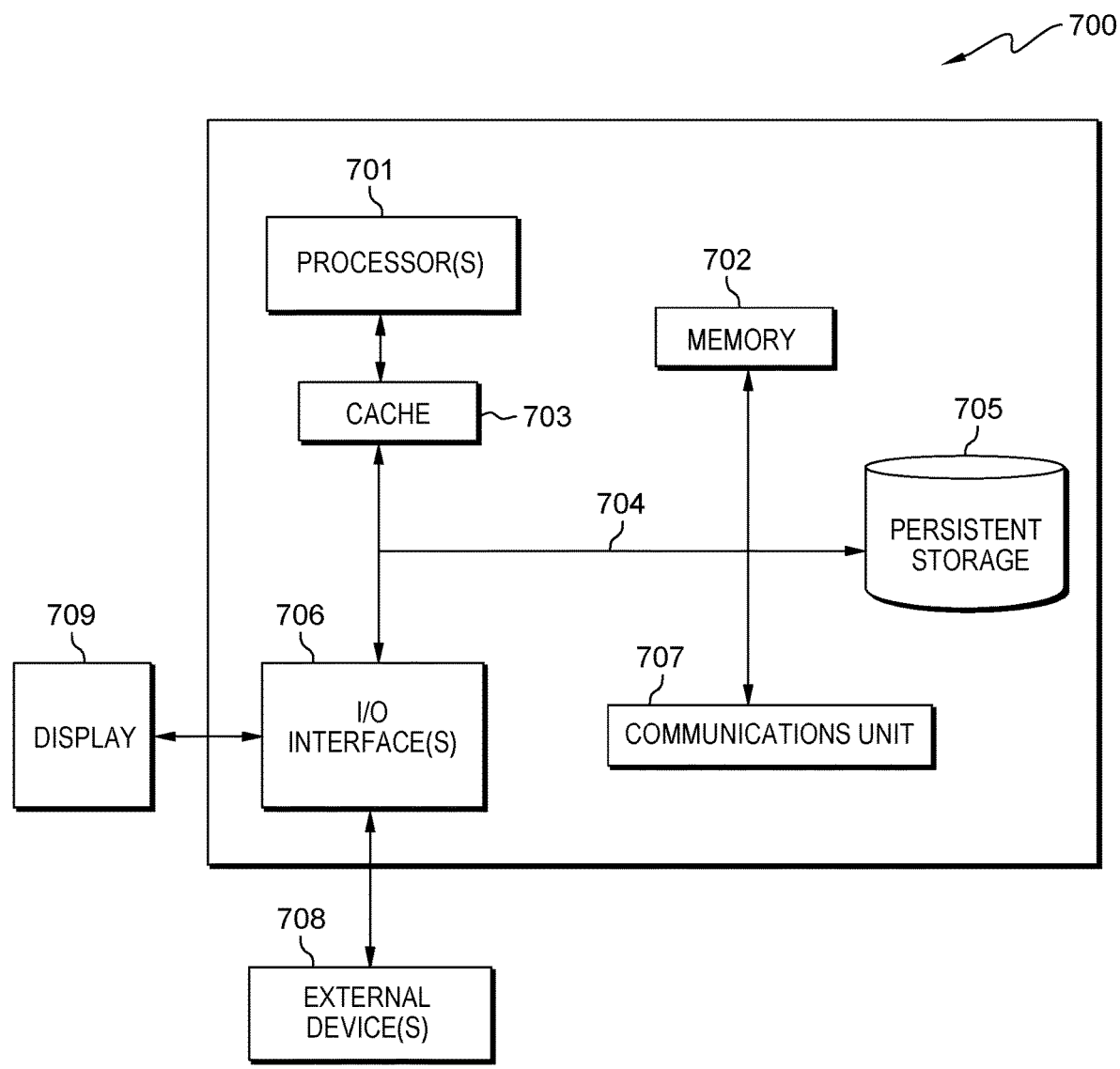
FIG. 7 depicts a block diagram of components of the server computer executing the automated feedback and continuous learning component within the distributed data processing environment of FIG. 3, in accordance with an embodiment of the present invention.

FIG. 7 depicts a block diagram of components of server computer 120 within distributed data processing environment 300 of FIG. 3, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

FIG. 7 depicts computer system 700, where server computer 120 and/or server computer 150 represents an example of computer system 700 that includes orchestration component 140. The computer system includes processors 701, cache 703, memory 702, persistent storage 705, communications unit 707, input/output (I/O) interface(s) 706, display 709, external device(s) 708 and communications fabric 704. Communications fabric 704 provides communications between cache 703, memory 702, persistent storage 705, communications unit 707, and input/output (I/O) interface(s) 706. Communications fabric 704 may be implemented with any architecture designed for passing data and/or control information between processors (such as microprocessors, communications, and network processors, etc.), system memory, peripheral devices, and any other hardware components within a system. For example, communications fabric 704 may be implemented with one or more buses or a crossbar switch.

Memory 702 and persistent storage 705 are computer readable storage media. In this embodiment, memory 702 includes random access memory (RAM). In general, memory 702 may include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 enables for input and output of data with other devices that may be connected to each computer system. For example, I/O interface 706 may provide a connection to external devices 708 such as a keyboard, keypad, a touch screen, and/or some other suitable input device. External devices 708 may also include portable computer readable storage media such as, for example, thumb drives, portable optical or magnetic disks, and memory cards. Software and data used to practice embodiments of the present invention may be stored on such portable computer readable storage media and may be loaded onto persistent storage 705 via I/O interface(s) 706. I/O interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for workload orchestration in a multi-cloud environment, the method comprising:
orchestrating and managing a workload in a decentralized multi-cloud environment using one or more smart contracts;
measuring, by a competency measurement component, competency of cloud services based on one or more predefined cloud benchmarks, a consensus network, and the one or more smart contracts;
generating, based on the consensus network and the smart contracts for the workload, an orchestration plan that is tailored to a best fit of a user for each workload, wherein the orchestration plan is in a JavaScript Object Notion (JSON) format and comprises key-value attributes, wherein the key-value attributes comprise: cloud service usage data, orchestration plan name, metadata, labels, and cloud provider name;
utilizing the key-value attributes to provision the workload;
validating and updating, by the consensus network and the one or more smart contracts, the orchestration plan and the competency of cloud services;
transforming the orchestration plan to an orchestration template, wherein the competency measurement component defines one or more cloud benchmark JSON templates; and
executing the orchestration template on an orchestration system.

2. The computer-implemented method of claim 1, wherein the executing of the generated orchestration plan comprises:
automatically signing and managing user contracts for cloud providers based on predetermined user settings.

3. The computer-implemented method of claim 1, further comprising:
outputting, by order peers, final measurement results; and
displaying, by a user interface on a computing device, the final measurement results to a user.

4. The computer-implemented method of claim 1, further comprising:
issuing, by a computing device, an alert notification to a user when final measurement results are stored on a ledger.

5. The computer-implemented method of claim 1, further comprising:
retrieving cloud service usage data of a workload from one or more cloud providers;
generating a report, based on the retrieved cloud service usage data; and
displaying, by a user interface, the report to a user.

6. The computer-implemented method of claim 1, further comprising:
receiving updated workload templates from a user;
submitting the updated workload templates to one or more cloud providers;
updating the orchestration plan based upon the updated workload templates; and
validating, by the consensus network, the updated orchestration plan.

7. The computer-implemented method of claim 1, further comprising:
issuing a charge notification to a user based on the orchestration plan, wherein the orchestration plan is stored in a ledger, and wherein issuing the charge notification comprises:
retrieving the charge notification from one or more cloud providers based on the orchestration plan; and
issuing the notification, by a user interface, to the user, alerting the user of the charge, wherein the notification comprises: cloud service usage data, and access to the orchestration plan, the workload, and the orchestration plan attributes.

8. A computer system for workload orchestration in a multi-cloud environment, the computer system comprising:
one or more computer processors;
one or more computer readable storage medium;
program instructions stored on the one or more computer readable storage medium for execution by at least one of the one or more computer processors, the stored program instructions comprising:
program instructions to orchestrate and manage a workload in a decentralized multi-cloud environment using one or more smart contracts;
program instructions to measure, by a competency measurement component, competency of cloud services based on one or more predefined cloud benchmarks, a consensus network, and the one or more smart contracts;
program instructions to generate, based on the consensus network and the smart contracts for the workload, an orchestration plan that is tailored to a best fit of a user for each workload, wherein the orchestration plan is in a JavaScript Object Notion (JSON) format and comprises key-value attributes, wherein the key-value attributes comprise: cloud service usage data, orchestration plan name, metadata, labels, and cloud provider name;
program instructions to utilize the key-value attributes to provision the workload;
program instructions to validate and update, by the consensus network and the one or more smart contracts, the orchestration plan and the competency of cloud services;
program instructions to transform the orchestration plan to an orchestration template, wherein the competency measurement component defines one or more cloud benchmark JSON templates; and
program instructions to execute the orchestration template on an orchestration system.

9. The computer system of claim 8, wherein the executing of the generated orchestration plan comprises:
program instructions to automatically sign and manage user contracts for cloud providers based on predetermined user settings.

10. The computer system of claim 8, further comprising:
program instructions to output, by order peers, final measurement results; and
program instructions to display, by a user interface on a computing device, the final measurement results to a user.

11. The computer system of claim 8, further comprising:
program instructions to issue, by a computing device, an alert notification to a user when final measurement results are stored on a ledger.

12. The computer system of claim 8, further comprising:
program instructions to retrieve cloud service usage data of a workload from one or more cloud providers;
program instructions to generate a report, based on the retrieved cloud service usage data; and
program instructions to display, by a user interface, the report to a user.

13. The computer system of claim 8, further comprising:
program instructions to receive updated workload templates from a user;
program instructions to submit the updated workload templates to one or more cloud providers;
program instructions to update the orchestration plan based upon the updated workload templates; and
program instructions to validate, by the consensus network, the updated orchestration plan.

14. The computer system of claim 8, further comprising:
program instructions to issue a charge notification to a user based on the orchestration plan, wherein the orchestration plan is stored in a ledger, and wherein issuing the charge notification comprises:
program instructions to retrieve the charge notification from one or more cloud providers based on the orchestration plan; and
program instructions to issue the notification, by a user interface, to the user, alerting the user of the charge, wherein the notification comprises: cloud service usage data, and access to the orchestration plan, the workload, and the orchestration plan attributes.

15. A computer program product for workload orchestration in a multi-cloud environment, the computer program product comprising:
one or more computer readable storage medium and program instructions stored on the one or more computer readable storage medium, the stored program instructions comprising:
program instructions to orchestrate and manage a workload in a decentralized multi-cloud environment using one or more smart contracts;
program instructions to measure, by a competency measurement component, competency of cloud services based on one or more predefined cloud benchmarks, a consensus network, and the one or more smart contracts;
program instructions to generate, based on the consensus network and the smart contracts for the workload, an orchestration plan that is tailored to a best fit of a user for each workload, wherein the orchestration plan is in a JavaScript Object Notion (JSON) format and comprises key-value attributes, wherein the key-value attributes comprise: cloud service usage data, orchestration plan name, metadata, labels, and cloud provider name;
program instructions to utilize the key-value attributes to provision the workload;
program instructions to validate and update, by the consensus network and the one or more smart contracts, the orchestration plan and the competency of cloud services;
program instructions to transform the orchestration plan to an orchestration template, wherein the competency measurement component defines one or more cloud benchmark JSON templates; and
program instructions to execute the orchestration template on an orchestration system.

16. The computer program product of claim 15, wherein the executing of the generated orchestration plan comprises:
program instructions to automatically sign and manage user contracts for cloud providers based on predetermined user settings.

17. The computer program product of claim 15, further comprising:
program instructions to output, by order peers, final measurement results;
program instructions to display, by a user interface on a computing device, the final measurement results to a user; and
program instructions to issue, by a computing device, an alert notification to a user when final measurement results are stored on a ledger.

18. The computer program product of claim 15, further comprising:
program instructions to retrieve cloud service usage data of a workload from one or more cloud providers;
program instructions to generate a report, based on the retrieved cloud service usage data; and
program instructions to display, by a user interface, the report to a user.

19. The computer program product of claim 15, further comprising:
program instructions to receive updated workload templates from a user;
program instructions to submit the updated workload templates to one or more cloud providers;
program instructions to update the orchestration plan based upon the updated workload templates; and
program instructions to validate, by the consensus network, the updated orchestration plan.

20. The computer program product of claim 15, further comprising:
program instructions to issue a charge notification to a user based on the orchestration plan, wherein the orchestration plan is stored in a ledger, and wherein issuing the charge notification comprises:
program instructions to retrieve the charge notification from one or more cloud providers based on the orchestration plan; and
program instructions to issue the notification, by a user interface, to the user, alerting the user of the charge, wherein the notification comprises: cloud service usage data, and access to the orchestration plan, the workload, and the orchestration plan attributes.

* * * * *